(12) United States Patent
Vajravel et al.

(10) Patent No.: US 10,798,201 B2
(45) Date of Patent: Oct. 6, 2020

(54) REDIRECTING USB DEVICES VIA A BROWSER-BASED VIRTUAL DESKTOP INFRASTRUCTURE APPLICATION

(71) Applicant: Dell Products L.P., Round Rock, TX (US)

(72) Inventors: Gokul Thiruchengode Vajravel, Bengaluru (IN); Sandeep KS, Thodupuzha (IN)

(73) Assignee: Dell Products L.P., Round Rock, TX (US)

( * ) Notice: Subject to any disclaimer, the term of this patent is extended or adjusted under 35 U.S.C. 154(b) by 146 days.

(21) Appl. No.: 16/267,149

(22) Filed: Feb. 4, 2019

(65) Prior Publication Data

US 2020/0252472 A1 Aug. 6, 2020

(51) Int. Cl.
| | |
|---|---|
| G06F 15/16 | (2006.01) |
| H04L 29/08 | (2006.01) |
| H04L 29/06 | (2006.01) |
| G06F 9/451 | (2018.01) |
| G06F 13/38 | (2006.01) |
| G06F 9/54 | (2006.01) |

(52) U.S. Cl.
CPC .......... *H04L 67/2814* (2013.01); *G06F 9/452* (2018.02); *G06F 13/382* (2013.01); *H04L 67/42* (2013.01); *G06F 9/541* (2013.01); *G06F 2213/0042* (2013.01)

(58) Field of Classification Search
CPC .......... G06F 9/452; G06F 9/541; G06F 13/10; G06F 13/105; G06F 13/382; G06F 2213/0042; H04L 67/025; H04L 67/125; H04L 67/2814; H04L 67/42

USPC ....................................................... 709/219
See application file for complete search history.

(56) References Cited

U.S. PATENT DOCUMENTS

| | | | |
|---|---|---|---|
| 9,582,444 B1* | 2/2017 | Kumar | G06F 3/067 |
| 10,067,891 B2* | 9/2018 | Venkatesh | G06F 13/4282 |
| 10,331,501 B2* | 6/2019 | Dai | G06F 9/526 |
| 10,489,311 B1* | 11/2019 | Vajravel | G06F 3/067 |
| 2007/0061477 A1* | 3/2007 | Stoyanov | H04L 67/34 709/230 |
| 2012/0158822 A1* | 6/2012 | Dai | G06F 9/54 709/203 |
| 2016/0124885 A1* | 5/2016 | Vajravel | G06F 13/4072 710/308 |
| 2016/0125205 A1* | 5/2016 | Vajravel | G06F 13/4095 710/108 |
| 2017/0031852 A1* | 2/2017 | Vajravel | G06F 13/36 |
| 2017/0034315 A1* | 2/2017 | Vajravel | G06F 13/4282 |

(Continued)

OTHER PUBLICATIONS

Grant et al. "WebUSB API". Aug. 18, 2020. pp. 1-32 (Year: 2020).*

*Primary Examiner* — Imad Hussain
(74) *Attorney, Agent, or Firm* — Kirton McConkie; Brian Tucker

(57) ABSTRACT

USB devices can be redirected via a browser-based virtual desktop infrastructure (VDI) application. To enable redirection of USB devices even when native drivers cannot be installed on the client terminal, the browser-based VDI application can include a proxy that employs a suitable API to access the USB device. The proxy can function as an intermediary for adapting the representation of the USB device that exists within the browser to the USB request block (URB) data structures by which the server-side components communicate with USB devices.

20 Claims, 13 Drawing Sheets

(56) References Cited

U.S. PATENT DOCUMENTS

| | | | |
|---|---|---|---|
| 2017/0060415 A1* | 3/2017 | Vajravel | G06F 3/067 |
| 2017/0060802 A1* | 3/2017 | Venkatesh | G06F 13/4282 |
| 2017/0063855 A1* | 3/2017 | Vajravel | H04L 67/42 |
| 2017/0063988 A1* | 3/2017 | Vajravel | G06F 13/4282 |
| 2017/0264649 A1* | 9/2017 | Sonar | G06F 21/82 |
| 2017/0272546 A1* | 9/2017 | Vajravel | H04L 67/142 |
| 2017/0286681 A1* | 10/2017 | Vajravel | G06F 13/4282 |
| 2017/0289262 A1* | 10/2017 | Vajravel | H04L 67/06 |
| 2017/0289313 A1* | 10/2017 | Vajravel | G06F 13/385 |
| 2017/0308492 A1* | 10/2017 | Vajravel | G06F 13/385 |
| 2017/0310790 A1* | 10/2017 | Vajravel | G06F 9/4411 |
| 2017/0315833 A1* | 11/2017 | Vajravel | G06F 3/0619 |
| 2017/0318112 A1* | 11/2017 | Johnsimon | H04L 67/2814 |
| 2017/0339234 A1* | 11/2017 | Vajravel | G06F 13/1642 |
| 2018/0213063 A1* | 7/2018 | Vajravel | H04L 41/046 |
| 2018/0232293 A1* | 8/2018 | Petrick | G06F 9/452 |
| 2018/0278707 A1* | 9/2018 | Chiu | H04L 67/42 |
| 2020/0053162 A1* | 2/2020 | Vajravel | H04L 61/2007 |

* cited by examiner

REDIRECTING USB DEVICES VIA A BROWSER-BASED VIRTUAL DESKTOP INFRASTRUCTURE APPLICATION

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented using a "native" VDI application (i.e., a VDI application that is installed directly on the client) as opposed to a "web" or "browser-based" VDI application (i.e., a VDI application that executes within a browser).

In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMwareg Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment.

FIG. 2 is a block diagram of a local device virtualization system 200. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260. Of importance to the present discussion, proxy 210 and stub driver 220 are components of a native application. That is to say, both proxy 210 and stub driver 220 are operating-system-specific components that are installed directly on client 102.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102). For purposes of this application, device 240 can represent an authentication device such as a smart card.

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

In recent years, there has been a move away from traditional, native applications to web (or browser-based) applications. Unfortunately, the above-described architecture and process cannot be employed when the VDI application is implemented as a web application. More particularly, when a VDI application is hosted within the browser, the VDI application will be limited to the functionality the browser provides, and browsers do not provide a way to redirect USB devices. Additionally, many clients 102 that support web applications do not allow native applications, such as stub driver 220, to be installed. Therefore, even if proxy 210 is converted into a web application, there will be no stub driver 220 or other native drivers available on client 102 to enable the redirection of USB devices.

BRIEF SUMMARY

The present invention extends to methods, systems, and computer program products for redirecting USB devices via a browser-based virtual desktop infrastructure (VDI) application. To enable redirection of USB devices even when native drivers cannot be installed on the client terminal, the browser-based VDI application can include a proxy that employs a suitable API to access the USB device. The proxy can function as an intermediary for adapting the representation of the USB device that exists within the browser to the USB request block (URB) data structures by which the server-side components communicate with USB devices.

In one embodiment, the present invention is implemented, by a proxy of a VDI application that executes within a browser on a client terminal, as a method for redirecting a USB device that is connected to the client terminal to enable the USB device to be accessed in a remote session on a server. The proxy receives a first URB from an agent that executes on the server. The proxy then evaluates contents of the first URB to determine a USB function that the first URB defines and a handle that defines a target of the USB function. The proxy also determines that the handle is associated with a browser-based representation of a first USB device that is connected to the client terminal. In response, the proxy invokes a function of the browser-based representation of the first USB device, the function corresponding to the USB function defined in the first URB.

In another embodiment, the present invention is implemented, by a proxy of a VDI application that executes within a browser on a client terminal, as a method for redirecting a USB device that is connected to the client terminal to enable the USB device to be accessed in a remote session on a server. The proxy obtains, from a browser-based representation of a first USB device that is connected to the client terminal, descriptors of the first USB device. The descriptors include a device descriptor, at least one configuration descriptor, at least one interface descriptor and at least one endpoint descriptor, each endpoint descriptor defining an endpoint of the first USB device. The proxy creates a data structure that maps a unique identifier to each endpoint defined in the browser-based representation of the first USB device. The proxy then receives a first URB from an agent that executes on the server. The proxy evaluates contents of the first URB to determine a USB function that the first URB defines and a pipe handle that defines an endpoint to which the USB function is directed. The proxy accesses the data structure to determine that the pipe handle matches the unique identifier that is mapped to a first endpoint defined in in the browser-based representation of the first USB device. The proxy then invokes a function of the browser-based representation of the first USB device, the function corresponding to the USB function defined in the first URB.

In another embodiment, the present invention is implemented as computer storage media storing computer executable instructions which when executed in a browser on a client terminal implement a proxy of a VDI application. The proxy is configured to perform a method for redirecting a USB device that is connected to the client terminal to enable the USB device to be accessed in a remote session on a server. This method includes: receiving, by the proxy and from an agent that executes on the server, a first USB request block (URB); evaluating contents of the first URB to determine a USB function that the first URB defines; determining that the first URB is associated with a browser-based representation of a first USB device that is connected to the client terminal; invoking a function of the browser-based representation of the first USB device, the function corresponding to the USB function defined in the first URB; and sending a second URB to the agent, the second URB including data obtained from the first USB device by invoking the function of the browser-based representation of the first USB device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In environments where it is not possible to install native USB drivers, such as on Chromebook and Windows 10S devices, the present invention can be employed to still enable USB device redirection via a browser-based VDI application. This is accomplished by configuring a proxy to employ a suitable browser-based API (e.g., the WebUSB API) to access the USB device from within the browser. The proxy can then function as an intermediary for adapting between the browser-based representation of the USB device that the API provides and the USB request block (URB) data structures that are employed by the server-side components to communicate with USB devices. In this way, the present invention implements redirection in a transparent manner from the perspective of the server-side USB client drivers even though native drivers (e.g., stub driver 220) may not be available on the client terminal.

Figure 1:
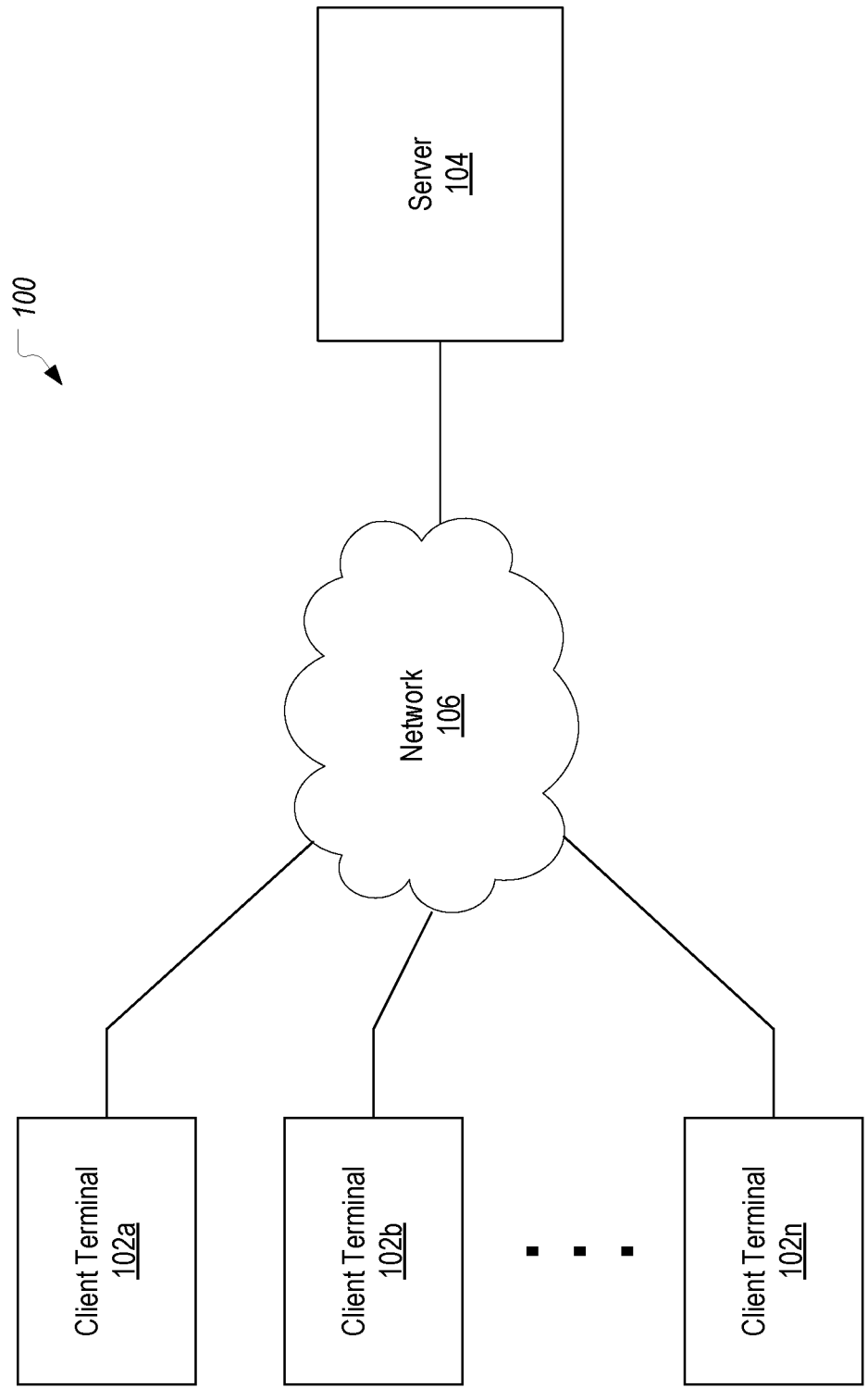
FIG. 1 illustrates an example computing environment in which the present invention can be implemented.
Figure 2:
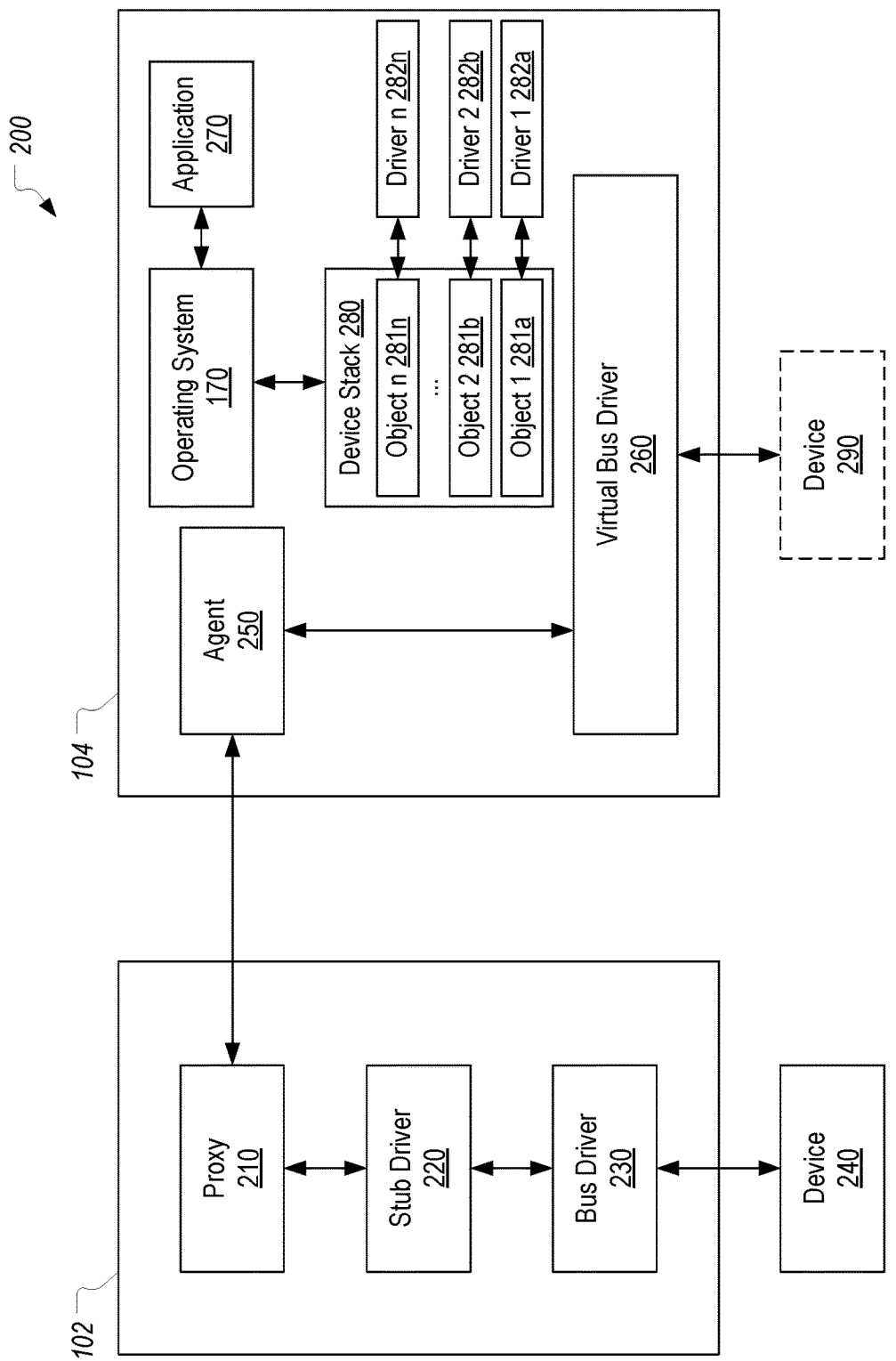
FIG. 2 illustrates how a USB device can be redirected from a client terminal to a server using native drivers on the client terminal.
Figure 3:
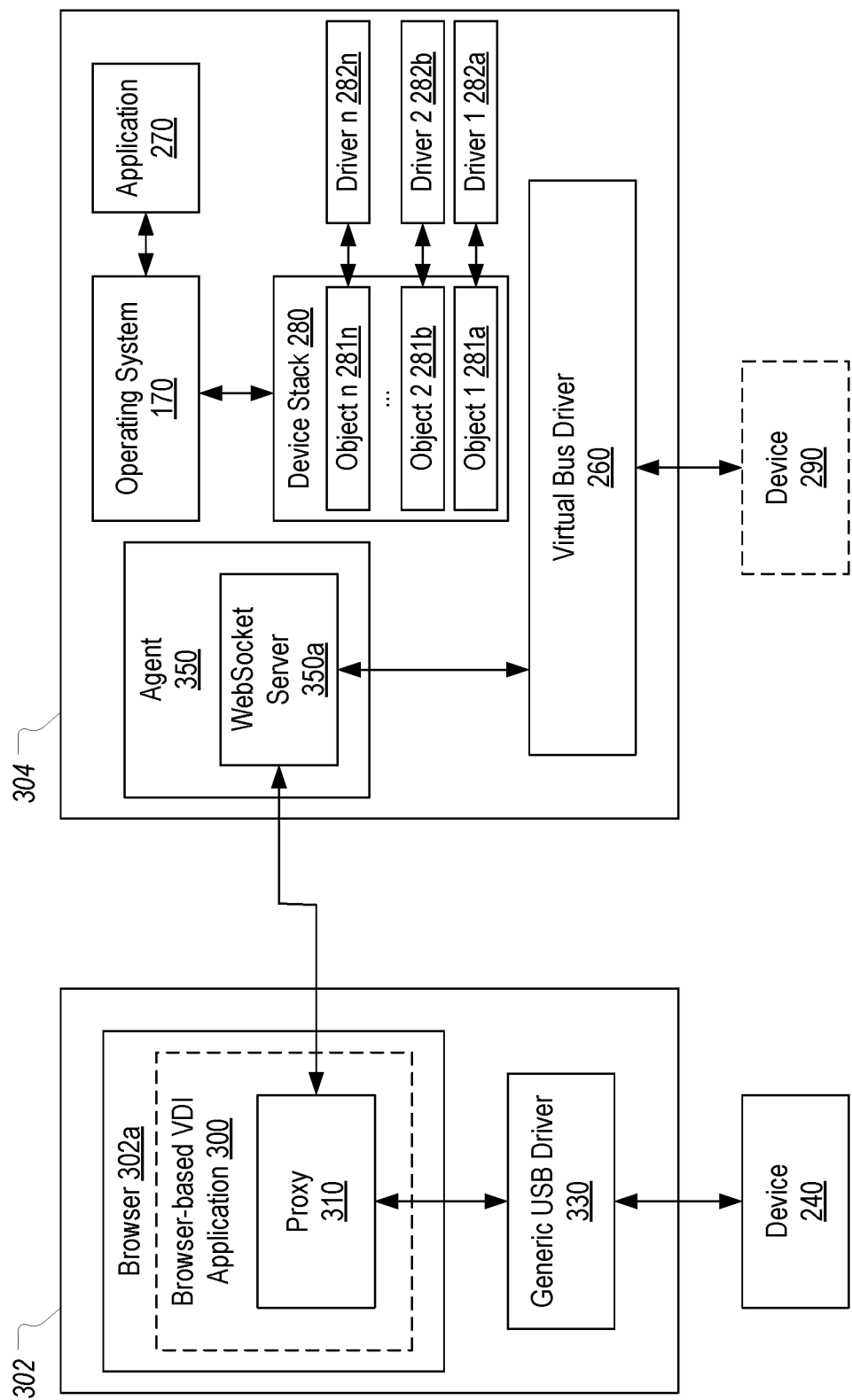
FIG. 3 illustrates an example architecture that the present invention employs to enable USB device redirection when the VDI application executes within a browser.

FIG. 3 illustrates an example architecture that can be employed to redirect USB devices from a client terminal 302. In contrast to the architecture shown in FIG. 2, in FIG. 3, client terminal 302 provides a restricted environment which includes a browser 302a within which a browser-based VDI application 300 is executed. VDI application 300 is configured to establish remote sessions on a server 304.

To enable redirection of USB devices for access within a remote session on server 304, VDI application 300 can include a proxy 310 that communicates with agent 350. Agent 350 is similar to agent 250 except that agent 350 implements a WebSocket server 350a for communicating USB data with proxy 310. In other words, proxy 310 and agent 350 can be configured to employ the Web Socket protocol to communicate for the purpose of redirecting a USB device to server 304.

Client terminal 302 is shown as including a generic USB driver 330. In this context, "generic" refers to the fact that USB driver 330 does not provide a device-specific functional stack by which proxy 310 (or any other component) could communicate with device 240. For example, in comparison to FIG. 2, stub driver 220 does not exist on client terminal 302. Accordingly, unlike in environment of FIG. 2, proxy 310 cannot route URBs to stub driver 220.

Figure 4A:
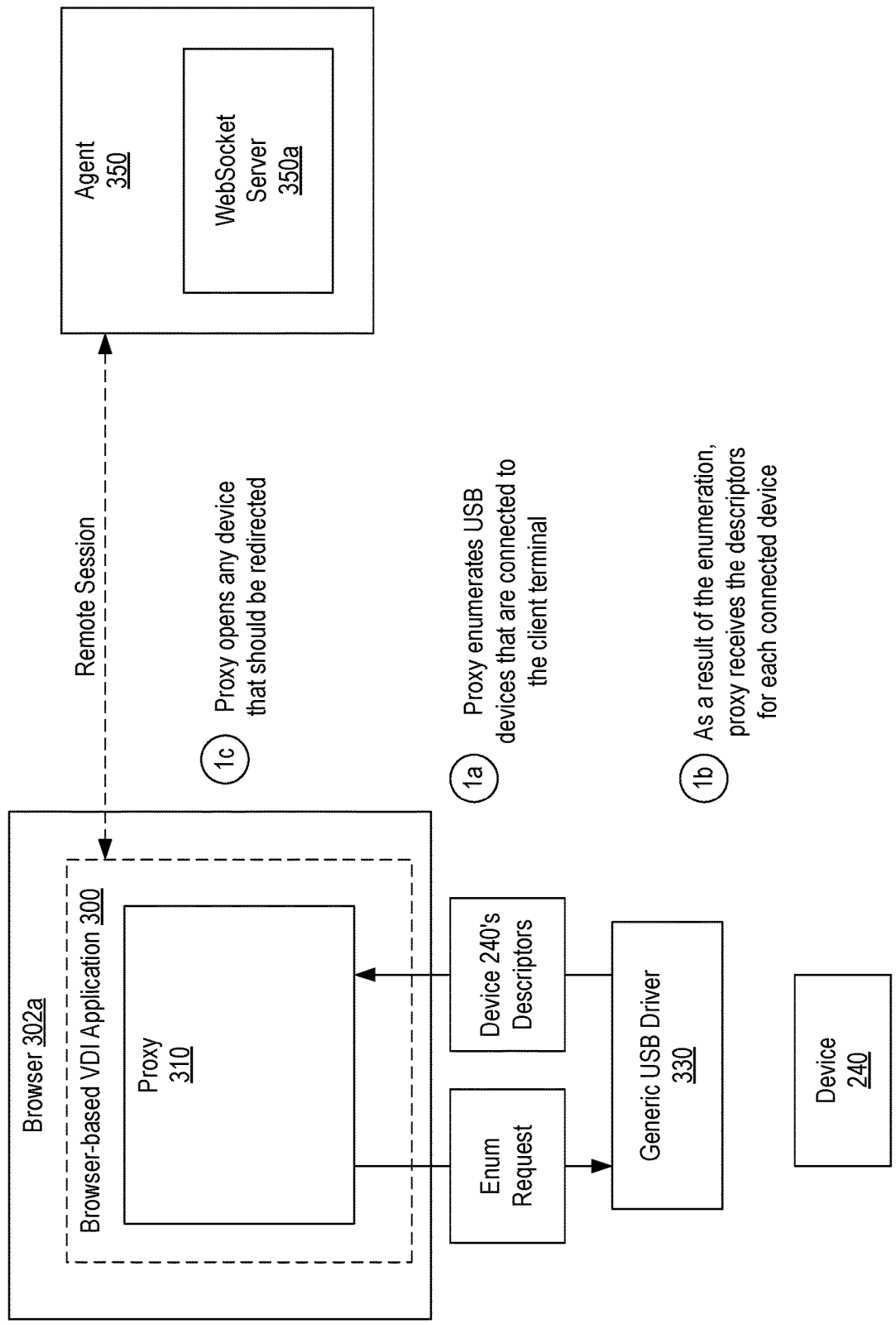
FIGS. 4A-4E illustrate how a browser-based VDI application can implement USB device redirection.

FIGS. 4A-4E illustrate how proxy 310 can implement USB device redirection in this type of restricted environment. As shown in FIG. 4A, it will be assumed that the user has employed VDI application 300 to establish a remote session on server 304 and that USB device 240 is coupled to client terminal 302. The process of redirecting device 240 to server 304 for access within the remote session could occur automatically as part of establishing the remote session, in response to the connection of USB device 240 or in response to user input requesting the redirection of USB device 240.

As shown in FIG. 4A, to initiate the redirection of a USB device, proxy 310 can first enumerate USB devices that are connected to client terminal 302 (i.e., proxy 310 first determines which if any devices are available for redirection). As mentioned above, this could occur in response to an event (e.g., by employing an event handler to respond to events representing the establishment of a remote session or the connection of a USB device) or manually in response to user input. Proxy 310 can accomplish this by causing an enumeration request (step 1a) to be sent to generic USB driver 330 which will respond (step 1b) with the device information for any connected USB device (or at least for any connected USB device that matches criteria in the enumeration request and that proxy 310 is authorized to access). For example, assuming device 240 is the only connected USB device, proxy 310 could call the getDevices function of the WebUSB API and, in response, would receive information about device 240. This information may include the various USB descriptors such as the device descriptors, configuration descriptors, interface descriptors, endpoint descriptors and string descriptors. For any connected device that is to be redirected, proxy 310 can also open the device in step 1c (e.g., by calling the open method of the WebUSB API). Opening the device ensures the proxy 310 will be able to access the device.

Figure 4B:
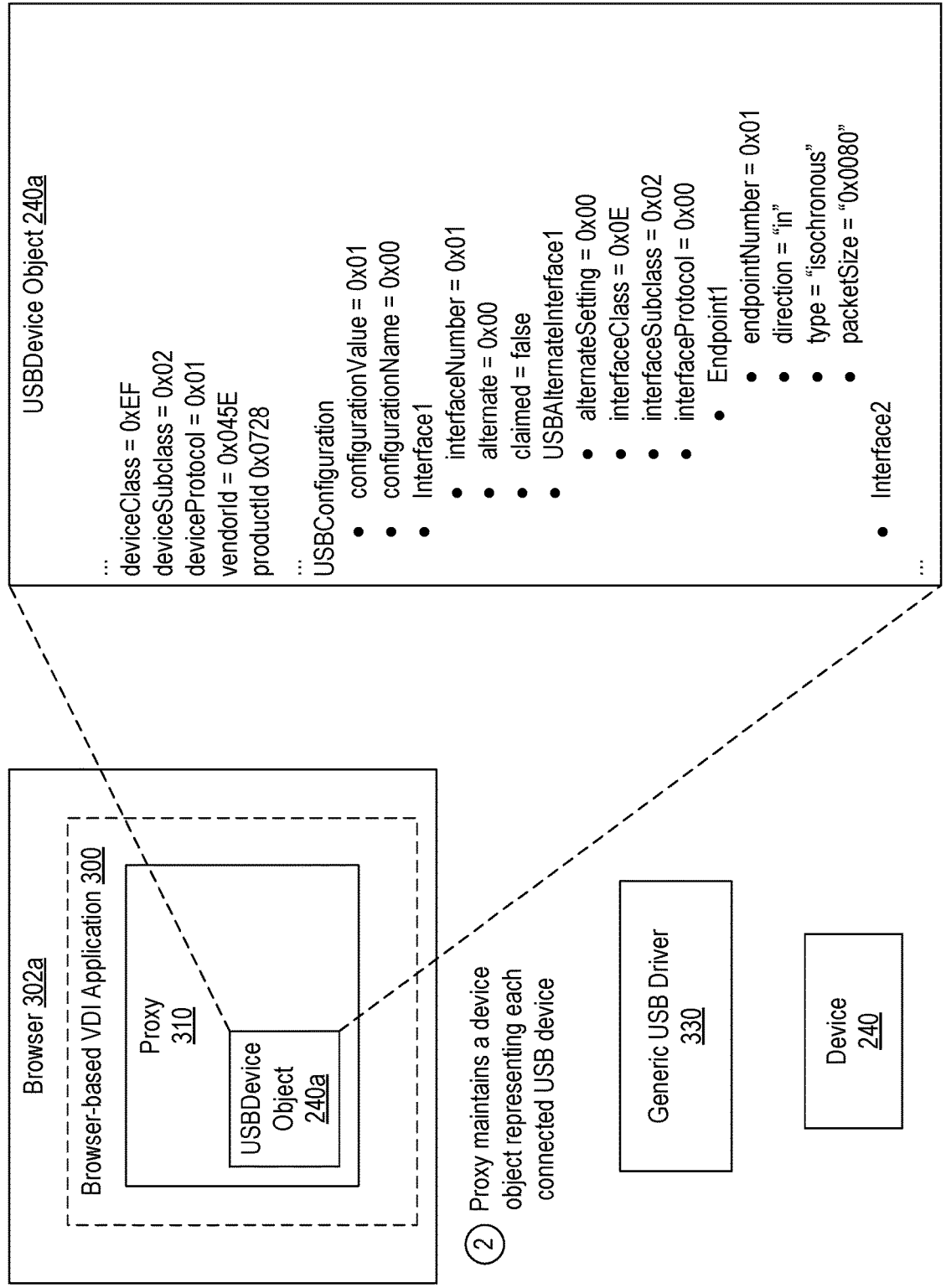

As represented in step 2 shown FIG. 4B, proxy 310 can maintain a USBDevice object 240a that represents device 240. For example, USBDevice object 240a can be a JavaScript construct that represents device 240 (e.g., as provided by the WebUSB API). USBDevice object 240a can therefore include a number of attributes which define the various values of device 240's descriptors. As is generally represented in FIG. 4B, it will be assumed that device 240 has a single configuration (with a bConfigurationValue of 0x01) and two interfaces (one of which has a bInterfaceNumber of 0x01).

Although not shown, in accordance with the WebUSB API, USBDevice Object 240a will also include a number of functions by which a browser-based component, such as proxy 310, can interface with device 240. Such functionality enables a USB device to be accessed from within the browser. However, in spite of this functionality, browser 302a, even with the WebUSB API, still provides no way for device 240 to be redirected to server 304. This is because the server-side components are configured to interface with a native USB driver (which does not exist on either server 304 or client terminal 302) while browser 302a only provides a JavaScript abstraction of the USB device—an abstraction that is incompatible with the server-side components. To address this incompatibility between the client-side and server-side architectures, proxy 310 functions as an intermediary between the incompatible components to thereby enable redirection of a USB device.

Figure 4C:
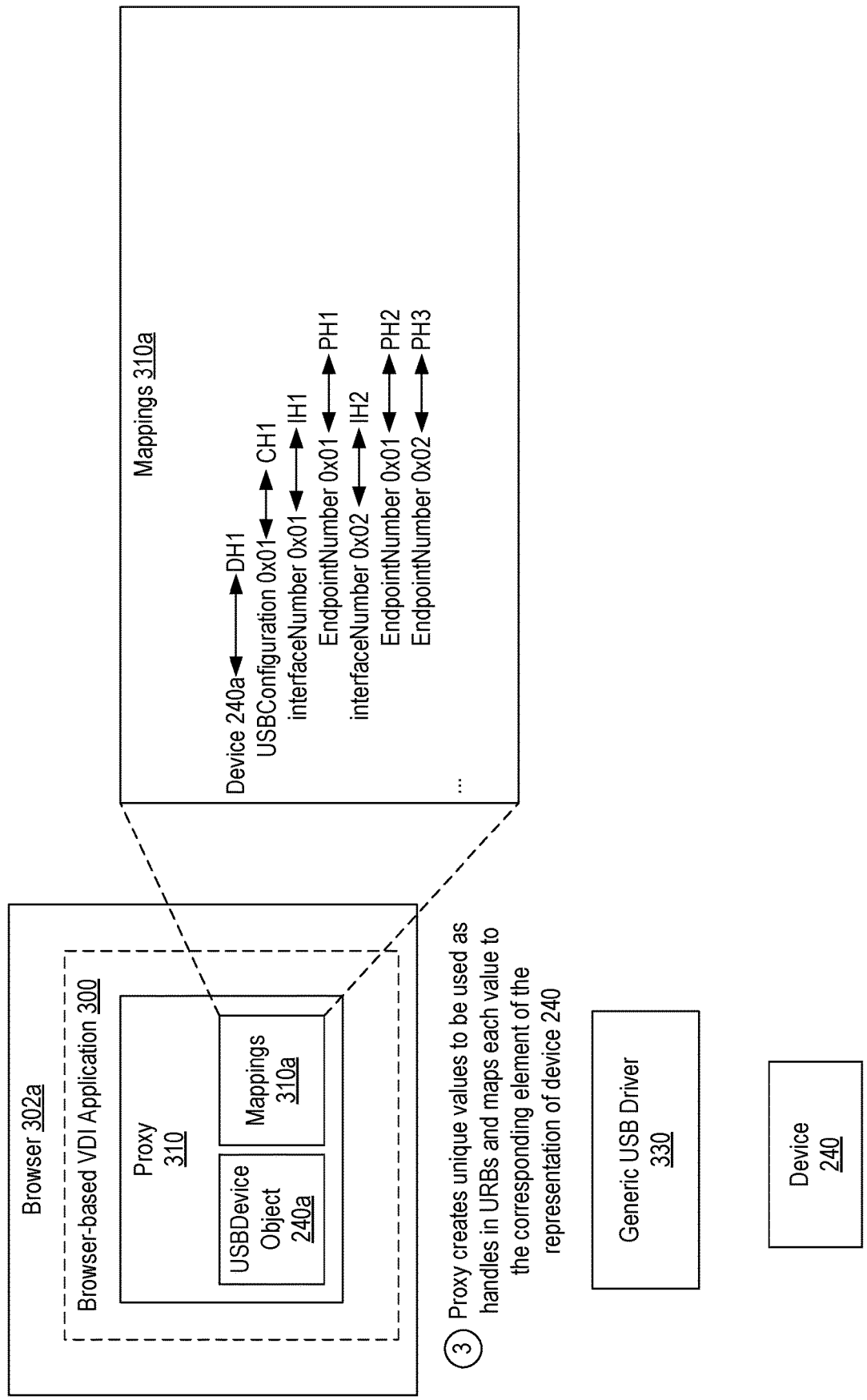
Figure 4D:
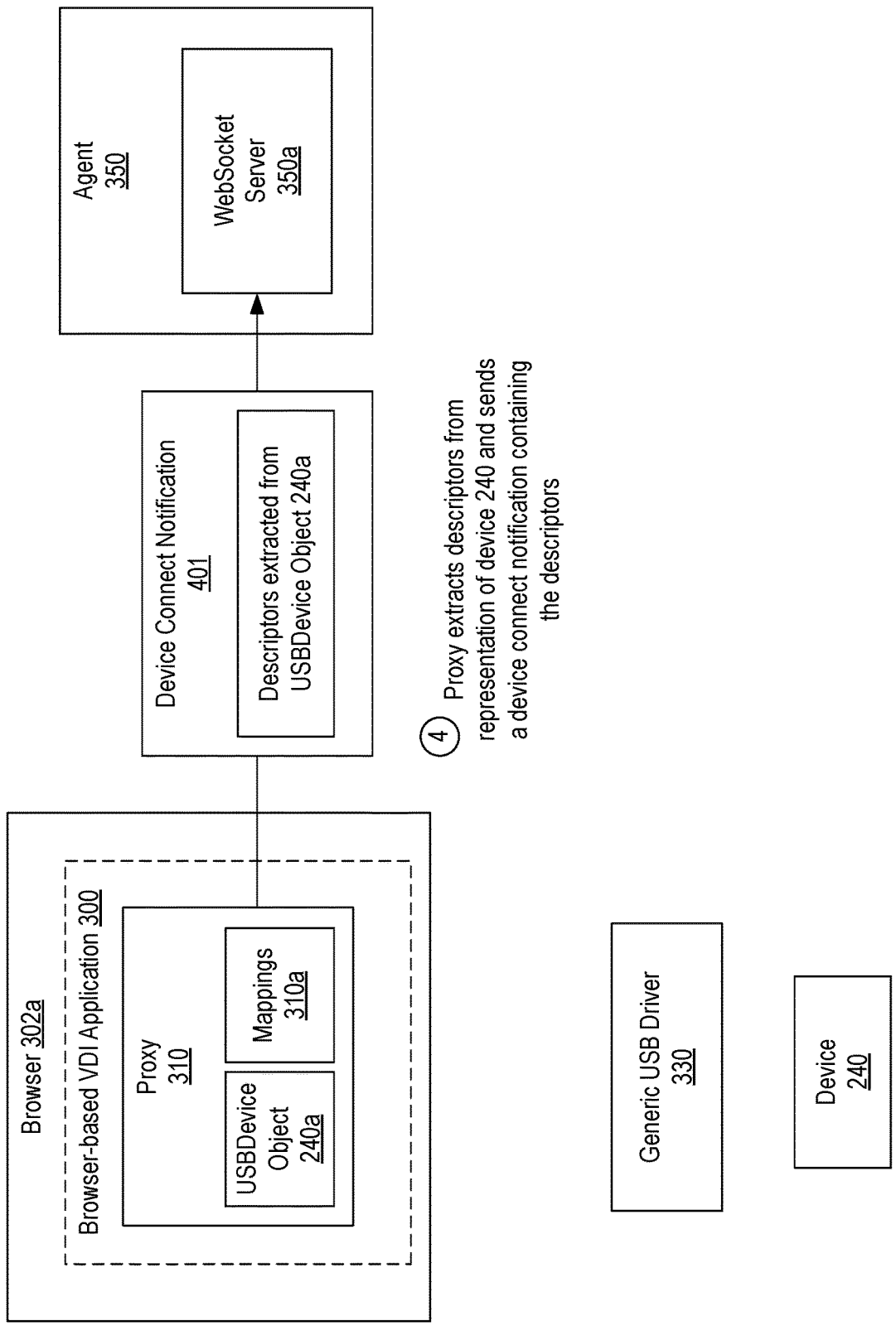

As represented as step 3 in FIG. 4C, to enable proxy 310 to function as an intermediary, proxy 310 can create unique values to represent the USB device itself and the various configurations, interfaces and endpoints of the USB device. Proxy 310 also maps these unique values to the corresponding element of USBDevice object 240a. As will be described in more detail below, these unique values can function as handles within URBs that are communicated between proxy 310 and the server-side components. Because the WebUSB API does not employ URBs, it also does not provide the handles that must be included within URBs. Mappings 310a can therefore be created and maintained to allow proxy 310 to identify to which device, configuration, interface and/or endpoint a particular URB pertains.

Mappings 310a can generally represent any type of data structure. In the depicted example, it is assumed that proxy 310 created the unique value DH1 to function as the USBDeviceHandle in URBs pertaining to device 240, the unique value CH1 to function as the ConfigurationHandle in URBs pertaining to configuration 0x01 of device 240, the unique value IH1 to function as the InterfaceHandle in URBs pertaining to interface 0x01, the unique value PH1 to function as the PipeHandle in URBs pertaining to endpoint 0x01 of interface 0x01, etc. It is noted that, in a typical USB architecture, the host controller driver provides these handles and then the client drivers use these handles. Accordingly, proxy 310 can be viewed as emulating functionality (the assigning of handles to devices, configurations, interfaces and endpoints) that would typically be performed by the host controller driver.

In the present example, it will be assumed that both interfaces should be redirected to server 304 (e.g., based on a governing policy, user input, etc.). To commence redirection of these two interfaces of device 240, and as represented by step 4 in FIG. 4D, proxy 310 can access USBDevice object 240*a* to extract the descriptors of device 240, and then build and send a device connect notification 401 that includes these descriptors and the device handle (DH1) to agent 350 via a WebSocket connection. In response to receiving device connect notification 401, agent 350 will report the connection of the device to virtual bus driver 260 which will cause device 240 to be enumerated on server 104 which in turn will result in a device stack being loaded for each interface (e.g., similar to device stack 280). At this point, server-side applications will see device 240 and will be able to send USB requests to device 240. If policy dictates that any interface should not be redirected, proxy 310 can exclude the descriptors of that interface from device connect notification 401 thereby allowing the interface to be accessed locally.

As is known, requests to access a USB device are in the form of a USB request block (URB). In particular, when an application on server 304 attempts to access device 240, device stack 280 will build an appropriate URB that will be passed down to virtual bus driver 260. Because the URB targets a redirected device, virtual bus driver 260 will route the URB to agent 350. Accordingly, in FIG. 4E and as represented by step 5*a*, an URB 410 is shown as being provided to agent 350. Then, in step 5*b*, agent 350 will employ a WebSocket connection (e.g., the same WebSocket connection used to transfer device connect notification 401) to send URB 410 to proxy 310. Unlike with the traditional redirection architecture, however, proxy 310 will not be able to route URB 410 to the appropriate native driver (e.g., stub driver 220) for delivery to the targeted USB device. To the contrary, the USB functionality provided by browser 302*a* does not employ URBs.

Figure 4E:
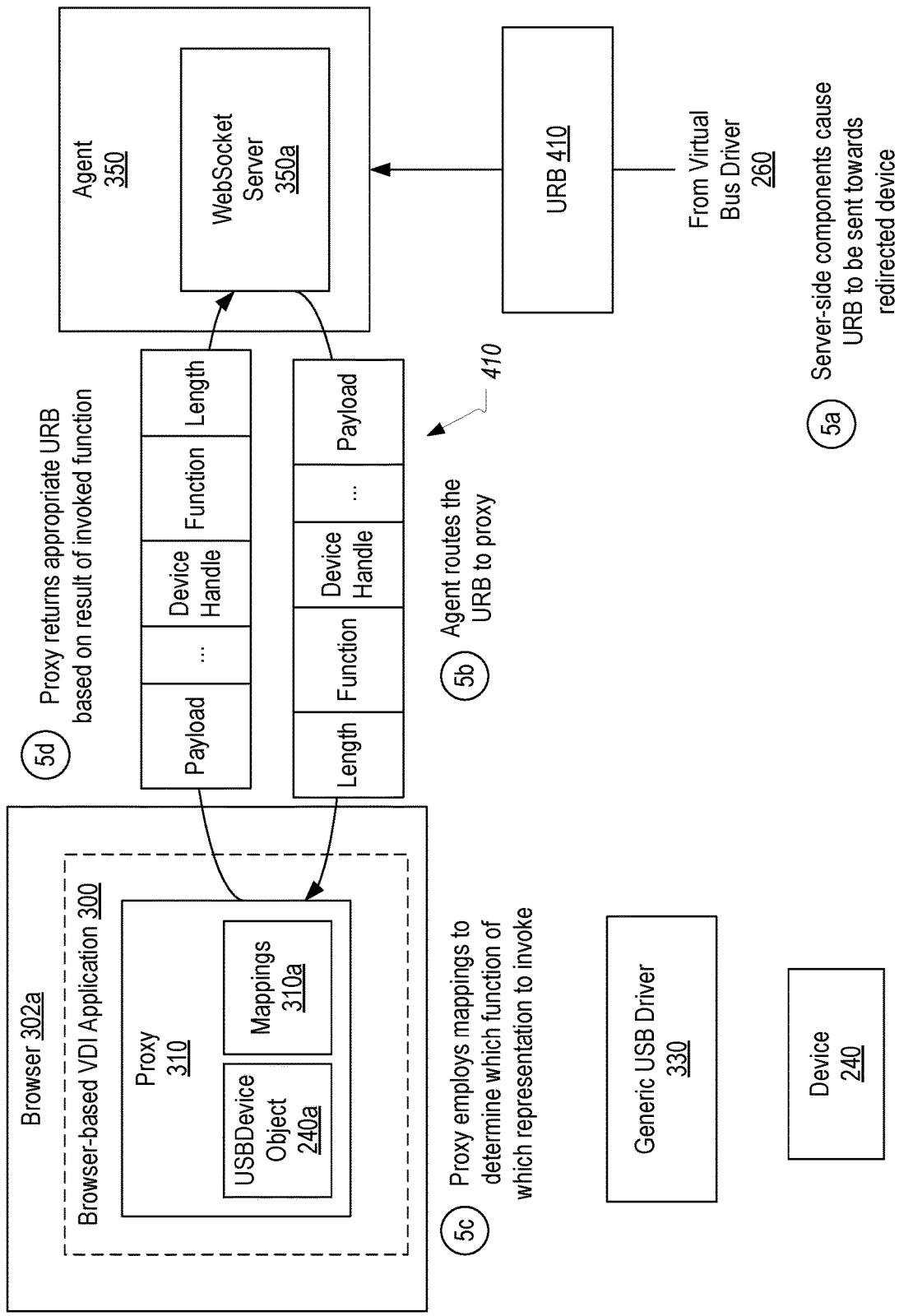

As represented in FIG. 4E, an URB typically includes an URB header which defines the length of the URB, its function (or "USB function") and the targeted USB device, along with a payload having contents specific to the defined function. As represented in step 5*c*, proxy 310 can be configured to receive URBs and process them to determine which functionality of which representation of a USB device (e.g., USBDevice object 240*a*) should be invoked to accomplish the functions defined in the URBs. This processing can include identifying the unique identifier(s)/handles within the URB, employing mappings 310*a* to determine to which device, configuration, interface, endpoint, etc. the URB is directed, and then invoking the appropriate functionality of the appropriate representation of the device. After the functionality is invoked, in step 5*d*, proxy 310 can also be configured to create and return URBs to agent 350 using data retrieved from the corresponding representation of the device. In this way, proxy 310 can map the content of URBs to the attributes and functionality exposed by the representation of the device (e.g., USBDevice object 240*a*).

Figure 5:
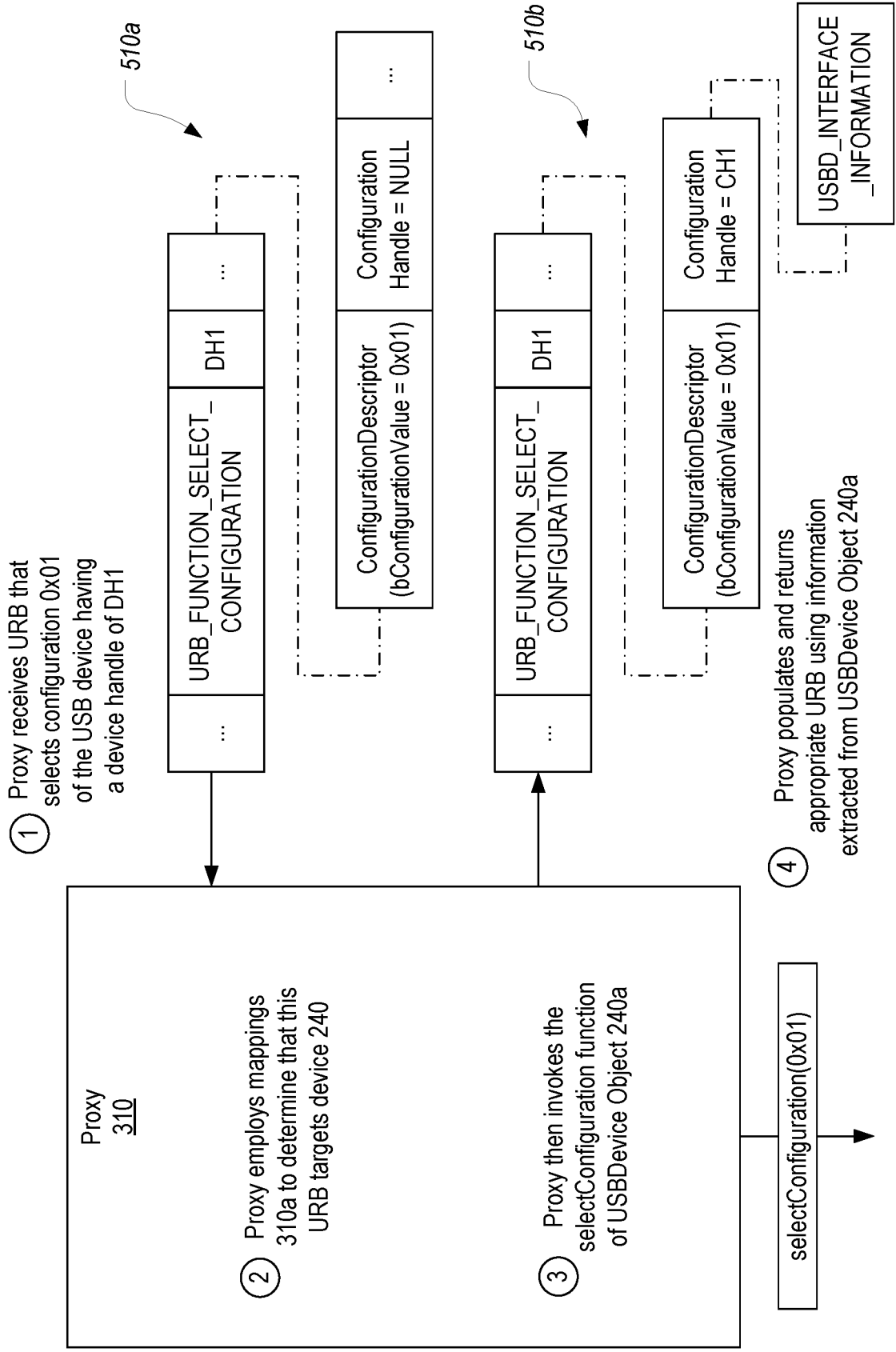
FIG. 5 provides an example of functionality performed by a proxy of the browser-based VDI application when an URB is received.

To better explain this adapting that proxy 310 performs, a number of examples will now be given. FIG. 5 represents how proxy 310 can handle an URB 510*a* that selects a configuration of a USB device. As shown in step 1, proxy 310 receives URB 510*a* from agent 350. URB 510*a* includes a header that defines, among other things, the URB_FUNCTION_SELECT_CONFIGURATION function and a device handle of DH1.

URB 510*a* also includes a payload that defines, among other things, the configuration descriptor for the selected configuration and a configuration handle that is assumed to be null at this point. It is noted that the configuration handle could be populated if proxy 310 had previously provided the configuration handle for configuration 0x01 to agent 350.

In step 2, proxy 310 processes URB 510*a* to extract the device handle DH1, and then uses DH1 to determine to which device URB 510*a* is directed. This is accomplished by accessing mappings 310*a* to determine that DH1 is the device handle that was assigned to USBDevice Object 240*a*.

Based on the content of URB 510*a*, proxy 310 can also determine that the selectConfiguration function of USBDevice Object 240*a* should be invoked and that the input to this function should match the configuration descriptor defined in URB 510*a*. Because URB 510*a* includes a configuration descriptor with a bConfigurationValue of 0x01, proxy 310 can determine that a configurationValue of 0x01 should be used as input to the selectConfiguration function. Accordingly, in step 3, proxy 310 invokes the selectConfiguration function. The invocation of this function will cause the WebUSB plugin to interface with generic USB driver 330 to cause configuration 0x01 to be selected on device 240.

Finally, in step 4, and assuming the selectConfiguration function completed successfully, proxy 310 can populate and return URB 510*b*. As shown, proxy 310 can employ mappings 310*a* to obtain and add the configuration handle CH1 to URB 510*b*. Accordingly, proxy 310 not only defines and maps the value of the configuration handle for device 240's configuration 0x01, but also reports this configuration handle in the responsive URB so that the client drivers on server 304 can use the configuration handle in subsequent requests.

Proxy 310 can also populate the USBD_INTERFACE_INFORMATION structures in the payload of URB 510*b* so that they describe the capabilities and format of the endpoints of the interfaces supported by the selected configuration. Although not shown, the USBD_INTERFACE_INFORMATION structures include an interface handle which proxy 310 can populate using mappings 310*a* as well as a USBD PIPE INFORMATION structure for each endpoint in the interface. Each USBD PIPE INFORMATION structure includes a pipe handle assigned to the corresponding end point. Proxy 310 can also populate these pipe handles using mappings 310*a*. Again, proxy 310 not only defines and maps the values of these handles, but also reports them so that the client drivers can use them in subsequent requests. By maintaining mappings 310*a*, proxy 310, upon receiving a subsequent URB, can determine to which browser-based representation of the device, configuration, interface, and/or endpoint the URB is directed using the handle(s) specified in the URB.

Proxy 310 can perform similar processing when it receives other types of control/configuration URBs. For example, in response to an URB that specifies the URB_FUNCTION_SELECT_INTERFACE function, proxy 310 can employ mappings 310*a* to identify the interface to be selected and to invoke the appropriate functionality (e.g., by calling claimInterface( )). Proxy 310 can then send a responsive URB that specifies a unique identifier to function as the pipe handle for each end point of the selected interface. To summarize, proxy 310 responds to URBs by: (1) invoking the appropriate functionality of the appropriate USBDevice Object to cause the intended function to be carried out on the USB device; and (2) creating and returning an appropriate URB that contains information extracted from the browser-based representation of the USB device.

Figure 6:
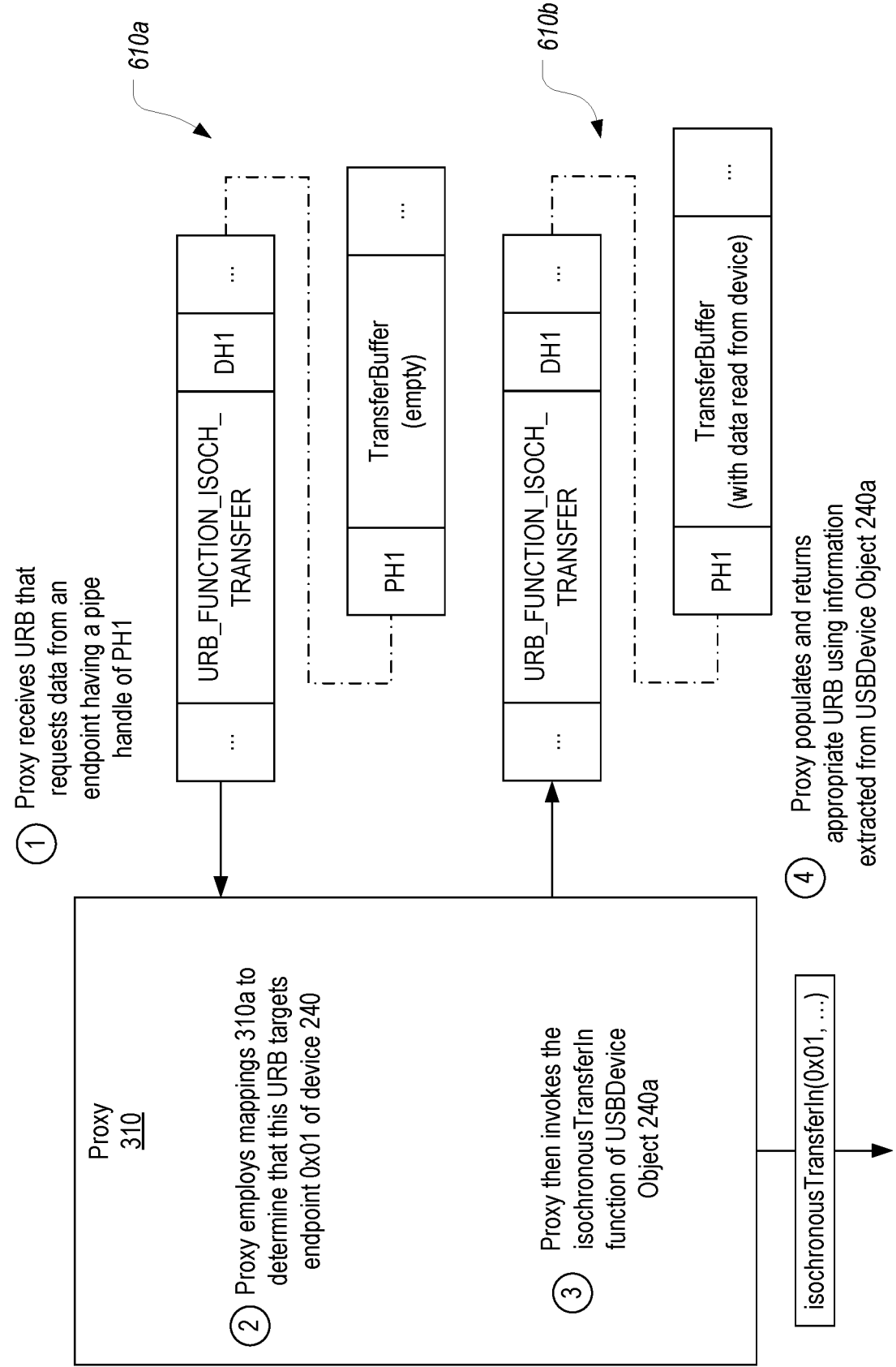
FIG. 6 provides another example of functionality performed by the proxy when an URB is received.

FIG. 6 provides another example representing how proxy 310 can handle a data transfer. As represented in step 1, proxy 310 receives URB 610*a* which defines an isochronous transfer request. Although not shown, it will be assumed that URB 610*a* has the USBD_TRANSFER_DIRECTION_IN flag set thereby defining that data should be read from device 240. URB 610*a* also specifies a pipe handle of PH1 which the server-side client driver that created URB 610*a* would have received previously from proxy 310.

In step 2, proxy 310 can process URB 610*a* to identify pipe handle PH1 and then use this pipe handle to search mappings 310*a* for the targeted endpoint. In this case, proxy 310 will determine that PH1 is mapped to device 240's endpoint 0x01 of interface number 0x01 under configuration 0x01. Based on this mapping, and based on URB 610*a* defining the URB_FUNCTION_ISOCH_TRANSFER function with the USBD_TRANSFER_DIRECTION_IN flag set, proxy 310 can determine that USBDevice object 240's isochronousTransferIn function should be called. Therefore, in step 3, proxy 310 can call the isochronousTransferIn function and specify the EndpointNumber (0x01) to which the pipe handle (PH1) is mapped and the amount of data to read or write in accordance with the payload of URB 610*a*.

Finally, in step 4, and assuming the isochronous transfer completes successfully, proxy 310 can populate and send URB 610*b* using the results of the call to the isochronousTransferIn function which can be obtained from USBDevice Object 240*a*. Proxy 310 can also set the pipe handle in URB 610*b* to PH1 based on mappings 310*a* which map EndpointNumber 0x01 to PH1.

A similar set of steps can be performed for other types of transfers. For example, when the URB specifies the URB_FUNCTION_BULK_OR_INTERRUPT_TRANSFER function, proxy 310 can employ mappings 310*a* to identify the proper endpoint and then invoke the transferIn function (read) or transferOut function (write) of the appropriate USBDevice Object using input parameters extracted from the URB. Likewise, when the URB specifies the URB_FUNCTION_CONTROL_TRANSFER function, proxy 310 can employ mappings 310*a* to identify the proper endpoint (which may be the default control endpoint) and then invoke the controlTransferIn function (read) or controlTransferOut function (write) of the appropriate USBDevice Object using input parameters extracted from the URB.

Figure 7A:
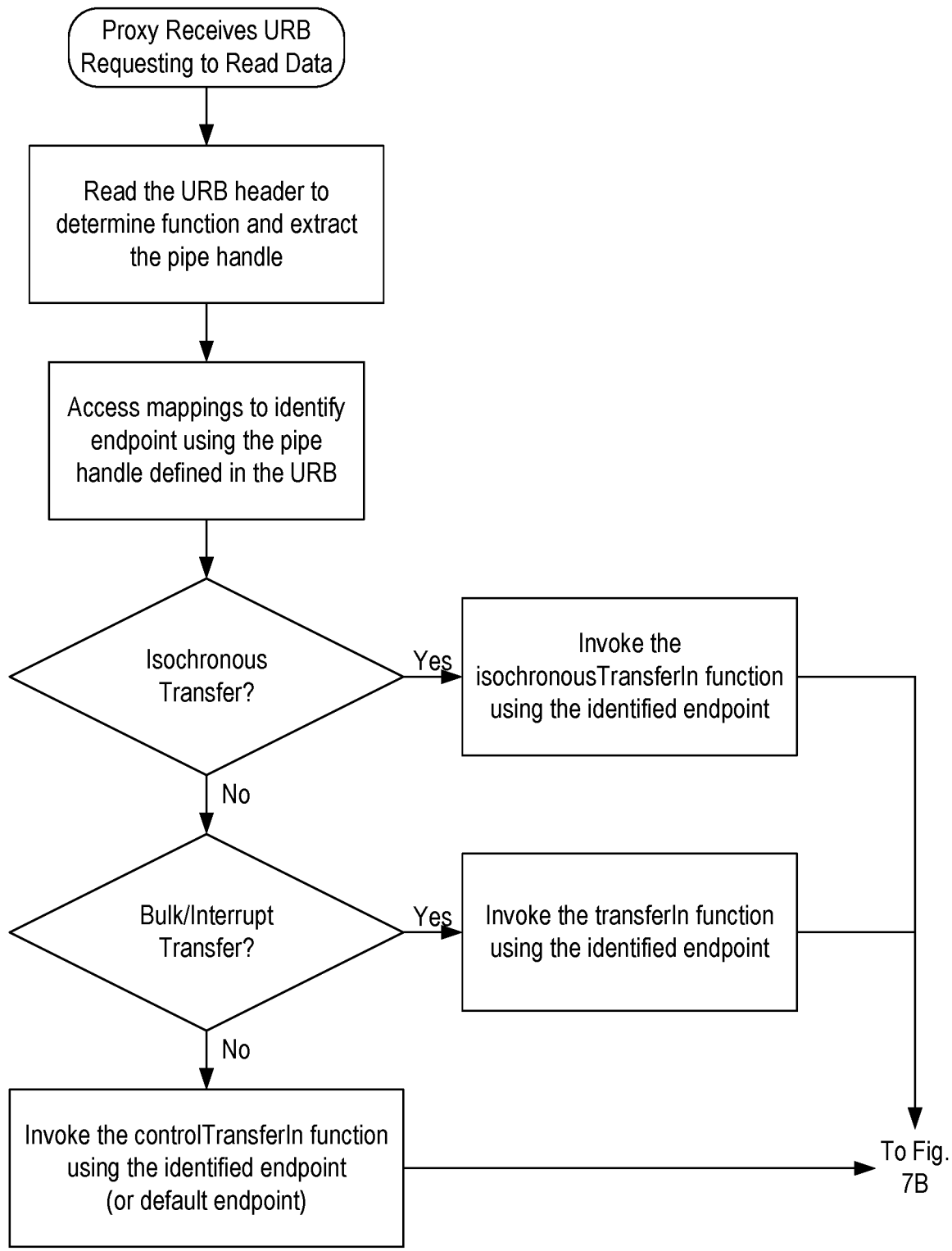
FIGS. 7A and 7B provide a flow diagram representing the functionality performed by the proxy when an URB defining a read request is received.
Figure 7B:
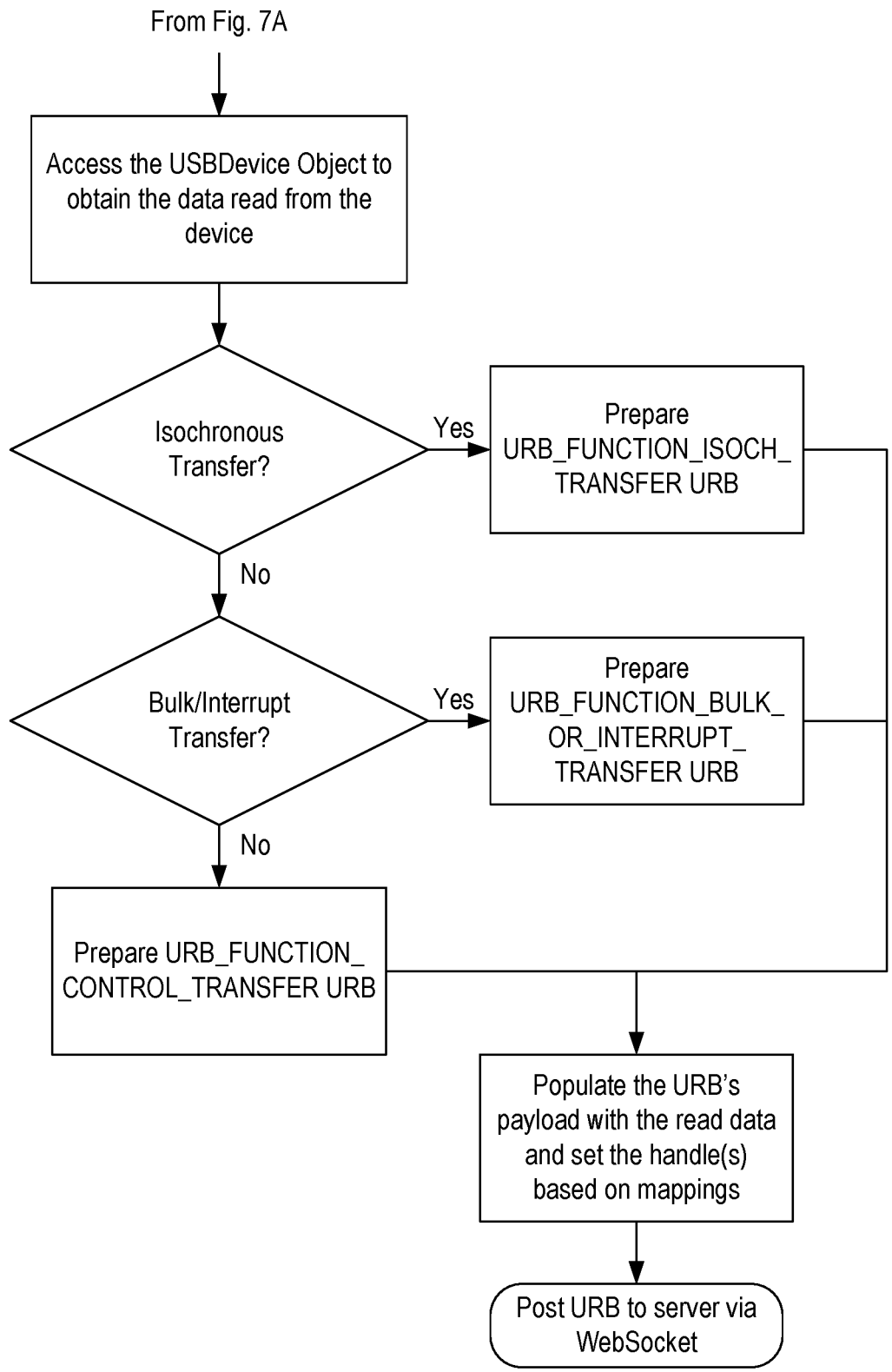

FIGS. 7A and 7B provide a flow diagram representing the functionality that proxy 310 performs when it receives an URB that requests that data be read from a redirected USB device. Such URBs would include in their URB headers the URB_FUNCTION_ISOCH_TRANSFER, URB_FUNCTION_BULK_OR_INTERRUPT_TRANSFER or URB_FUNCTION_CONTROL_TRANSFER (or TRANSFER_EX) function. Accordingly, upon receiving such URBs, proxy 310 can read the URB header to determine the requested function. Proxy 310 can also extract the pipe handle defined in the URB. Using the extracted pipe handle, proxy 310 can access mappings 310*a* to determine to which endpoint, and therefore to which USBDevice Object, the read request is directed.

If the URB specifies the URB_FUNCTION_ISOCH_TRANSFER function, proxy 310 can invoke the isochronousTransferIn function of the USBDevice Object that includes the endpoint to which the pipe handle maps. Alternatively, if the URB specifies the URB_FUNCTION_BULK_OR_INTERRUPT_TRANSFER function, proxy 310 can invoke the transferIn function of the USBDevice Object that includes the endpoint to which the pipe handle maps. If the URB requests neither an isochronous or bulk/interrupt transfer, proxy 310 can invoke the controlTransferIn function of the USBDevice Object that includes the endpoint to which the pipe handle maps. In each of these cases, the input parameters for the function call (e.g., the amount of data to read) can be based on the contents of the URB.

Turning to FIG. 7B, after successful completion of the appropriate function of the appropriate USBDevice Object, proxy 310 can access the USBDevice Object to obtain the data read from the USB device (e.g., by reading the USBInTransferResult). Based on the function, proxy 310 can then prepare an appropriate URB (URB_FUNCTION_ISOCH_TRANSFER, URB_FUNCTION_BULK_OR_INTERRUPT_TRANSFER or URB_FUNCTION_CONTROL_TRANSFER), populate the URB's payload with the data that was read from the USB device and set the pipe handle of the URB to the pipe handle mapped to the endpoint from which the data was read. Proxy 310 can then post the URB that it created and populated to agent 350 via a Web Socket connection.

In summary, the present invention allows a USB device that is accessible via the WebUSB API (or another suitable browser-based API) to be redirected to a server. Proxy 310 functions as an intermediary for adapting URBs to WebUSB API function calls and vice versa. Proxy 310 also emulates functionality that the host controller driver would typically provide to thereby map handles used in URBs to the browser-based representations of USB devices, configurations, interfaces and endpoints. In this way, proxy 310 enables a USB device to be redirected via a browser-based VDI application in a manner that is transparent to the server-side USB client drivers.

Figure 8:
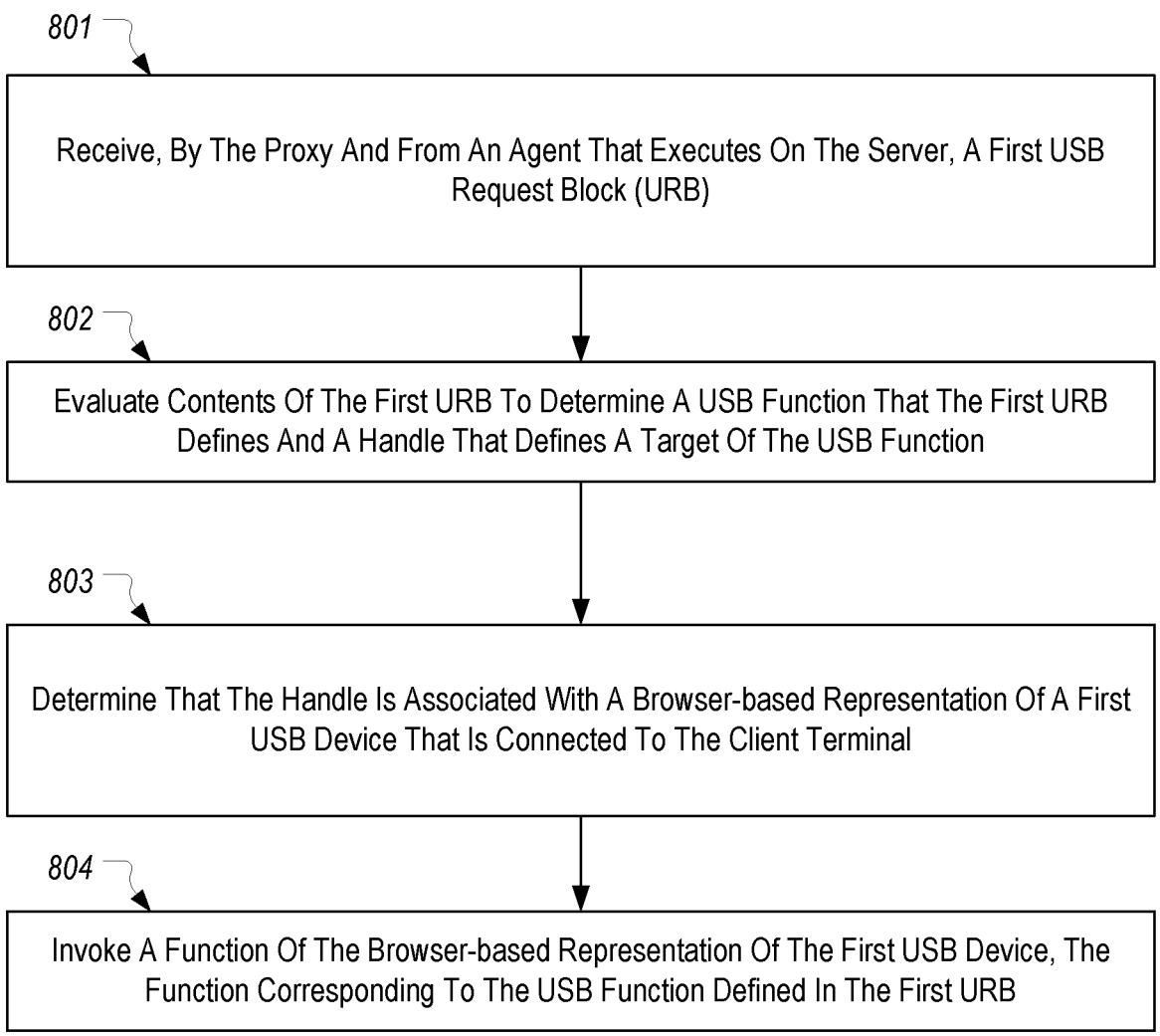
FIG. 8 provides a flowchart of an example method for redirecting a USB device via a browser-based VDI application.

FIG. 8 provides a flowchart of an example method 800 for redirecting a USB device. Method 800 can be implemented by proxy 310 that executes within browser 302*a* to enable a USB device, such as USB device 240, to be accessed in a remote session on server 304.

Method 800 includes an act 801 of receiving a first URB. For example, proxy 310 could receive URB 410, 510*a* or 610*a* from agent 350.

Method 800 includes an act 802 of evaluating contents of the first URB to determine a USB function that the first URB defines and a handle that defines a target of the USB function. For example, proxy 310 could determine that URB 510*a* defines the URB_FUNCTION_SELECT_CONFIGURATION function and includes a device handle of DH1. Similarly, proxy 310 could determine that URB 610*a* defines the URB_FUNCTION_ISOCH_TRANSFER function and includes a pipe handle of PH1.

Method 800 includes an act 803 of determining that the handle is associated with a browser-based representation of a first USB device that is connected to the client terminal. For example, proxy 310 can access mappings 310*a* to determine that DH1 is mapped to USBDevice object 240*a* or that PH1 is mapped to endpoint number 0x01 within USBDevice object 240*a*.

Method 800 includes an act 804 of invoking a function of the browser-based representation of the first USB device, the function corresponding to the USB function defined in the first URB. For example, proxy 310 could call the selectConfiguration function of USBDevice object 240*a* with an input parameter of 0x01 when URB 510*a* defines the URB_FUNCTION_SELECT_CONFIGURATION function, a device handle of DH1 and a value of 0x01 for the selected configuration. Similarly, proxy 310 could call the isochronousTransfer function of USBDevice object 240*a* with an input parameter of 0x01 when URB 610*a* defines the URB_FUNCTION_ISOCH_TRANSFER function and a pipe handle of PH1 that maps to endpoint number 0x01 of USBDevice object 240*a*.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a proxy of a virtual desktop infrastructure (VDI) application that executes within a browser on a client terminal, for redirecting a USB device that is connected to the client terminal to enable the USB device to be accessed in a remote session on a server, the method comprising:

receiving, by the proxy and from an agent that executes on the server, a first USB request block (URB);

evaluating contents of the first URB to determine a USB function that the first URB defines and a handle that defines a target of the USB function;

determining that the handle is associated with a browser-based representation of a first USB device that is connected to the client terminal; and invoking a function of the browser-based representation of the first USB device, the function corresponding to the USB function defined in the first URB.

2. The method of claim 1, further comprising:

obtaining, from the browser-based representation of the first USB device, data that was returned by the first USB device as a result of invoking the function of the browser-based representation of the first USB device;

generating a second URB that defines the USB function and the handle;

populating a payload of the second URB with the data; and sending the second URB to the agent.

3. The method of claim 2, wherein the first URB is received and the second URB is sent using the Web Socket protocol.

4. The method of claim 1, wherein the handle is a pipe handle.

5. The method of claim 4, wherein the USB function is a request to read data from or write data to the first USB device.

6. The method of claim 4, wherein determining that the pipe handle is associated with the browser-based representation of the first USB device comprises accessing a data structure which defines mappings between pipe handles and endpoint numbers defined in the browser-based representation of the first USB device.

7. The method of claim 1, wherein the handle is a device handle.

8. The method of claim 7, wherein the USB function is a request to select a configuration of the first USB device.

9. The method of claim 7, wherein determining that the device handle is associated with the browser-based representation of the first USB device comprises accessing a data structure which maps the device handle to the browser-based representation of the first USB device.

10. The method of claim 1, wherein invoking the function of the browser-based representation of the first USB device comprises invoking a function of the WebUSB API.

11. The method of claim 1, wherein the browser-based representation of the first USB device includes at least one configuration of the first USB device, at least one interface for each configuration and at least one endpoint for each interface, wherein the method further comprises:

creating and mapping a unique identifier to each endpoint included in the browser-based representation; and employing the unique identifiers as pipe handles in URBs that are sent to the agent.

12. The method of claim 11, further comprising:

creating and mapping a unique identifier to each interface and configuration;

employing each unique identifier that is mapped to an interface as an interface handle in URBs that are sent to the agent; and employing each unique identifier that is mapped to a configuration as a configuration handle in URBs that are sent to the agent.

13. A method, performed by a proxy of a virtual desktop infrastructure (VDI) application that executes within a browser on a client terminal, for redirecting a USB device that is connected to the client terminal to enable the USB device to be accessed in a remote session on a server, the method comprising:

obtaining, from a browser-based representation of a first USB device that is connected to the client terminal, descriptors of the first USB device, the descriptors including a device descriptor, at least one configuration descriptor, at least one interface descriptor and at least one endpoint descriptor, each endpoint descriptor defining an endpoint of the first USB device;

creating a data structure that maps a unique identifier to each endpoint defined in the browser-based representation of the first USB device;

receiving, from an agent that executes on the server, a first USB request block (URB);

evaluating contents of the first URB to determine a USB function that the first URB defines and a pipe handle that defines an endpoint to which the USB function is directed;

accessing the data structure to determine that the pipe handle matches the unique identifier that is mapped to a first endpoint defined in in the browser-based representation of the first USB device; and invoking a function of the browser-based representation of the first USB device, the function corresponding to the USB function defined in the first URB.

14. The method of claim 13, further comprising:
sending each unique identifier to the agent to enable client drivers on the server to employ each unique identifier as a pipe handle in URBs.

15. The method of claim 14, wherein sending each unique identifier to the agent comprises sending one or more URBs to the agent that include each unique identifier.

16. The method of claim 13, wherein the data structure also maps unique identifiers to each interface and each configuration, wherein the method further comprises:
sending each unique identifier that is mapped to an interface and each unique identifier that is mapped to a configuration to the agent to enable client drivers on the server to employ the unique identifiers as interface handles and configuration handles respectively in URBs.

17. The method of claim 13, wherein the browser-based representation of the first USB device is a USBDevice object provided by the WebUSB API.

18. The method of claim 13, wherein the USB function defined in the first URB is a request to read data from the first USB device, wherein the method further comprises:
generating a second URB that defines the USB function and includes the pipe handle;
populating a payload of the second URB with data obtained from the invocation of the function of the browser-based representation of the first USB device; and
sending the second URB to the agent.

19. One or more computer storage media storing computer executable instructions which when executed in a browser on a client terminal implement a proxy of a virtual desktop infrastructure (VDI) application, the proxy being configured to perform a method for redirecting a USB device that is connected to the client terminal to enable the USB device to be accessed in a remote session on a server, the method comprising:
receiving, by the proxy and from an agent that executes on the server, a first USB request block (URB);
evaluating contents of the first URB to determine a USB function that the first URB defines;
determining that the first URB is associated with a browser-based representation of a first USB device that is connected to the client terminal;
invoking a function of the browser-based representation of the first USB device, the function corresponding to the USB function defined in the first URB; and
sending a second URB to the agent, the second URB including data obtained from the first USB device by invoking the function of the browser-based representation of the first USB device.

20. The computer storage media of claim 19, wherein determining that the first URB is associated with the browser-based representation of the first USB device comprises determining that the first URB includes a handle that is mapped to an element of the browser-based representation of the first USB device.

* * * * *